United States Patent [19]

Havens

[11] 4,101,614
[45] Jul. 18, 1978

[54] BLOWN FILM PROCESS

[75] Inventor: Carl B. Havens, Fresno, Calif.

[73] Assignee: The Dow Chemical Company, Midland, Mich.

[21] Appl. No.: 710,984

[22] Filed: Aug. 2, 1976

Related U.S. Application Data

[63] Continuation of Ser. No. 554,951, Mar. 3, 1975, abandoned, which is a continuation of Ser. No. 376,834, Jul. 5, 1973, abandoned.

[51] Int. Cl.² ............................................. B29F 3/08
[52] U.S. Cl. .................................... 264/40.6; 264/95; 264/237; 425/143; 425/326.1
[58] Field of Search ............... 264/89, 95, 210 R, 237, 264/40.1, 348, 40.6; 425/143, 170, 72, 326 R, 326.1

[56] References Cited

U.S. PATENT DOCUMENTS

| | | | |
|---|---|---|---|
| 3,092,874 | 6/1963 | Fallwell | 264/40.1 |
| 3,125,616 | 3/1964 | Cook et al. | 264/40.1 |

OTHER PUBLICATIONS

Film Cooling & Frost Line–Polyethylene Film Extrusion–*An Operating Manual* – U.S.I.–1960–Nat. Dist. & Chem. Corp. pp. 27–30.
"Effect of Extrusion Variables on the Fundamental Properties of Tubular Film"–*Plastics*, 4–1961 –vol. 26 –Clegg – pp. 114–116.

*Primary Examiner*—Jeffery R. Thurlow
*Attorney, Agent, or Firm*—Burke M. Halldorson; Tai-Sam Choo

[57] ABSTRACT

A blown film process wherein: the temperature of the film is continually monitored in a select control or target area that is remote from the film frost line; a control of "target temperature" is determined based empirically or otherwise on a given set of companion operating conditions; and a variable film cooling source or supply is regulated to establish the control temperature as an essentially constant or non-variable operating condition. The process is characterized by an essentially stable frost line position and to the extent movement of the frost line can be optically or otherwise observed or sensed, and an appropriate signal derived therefrom, the process can be alternately practiced based on monitoring the position of the frost line, defining a control or "target" frost line position, and regulating a film cooling source responsive to deviances or movement from the control position.

2 Claims, 1 Drawing Figure

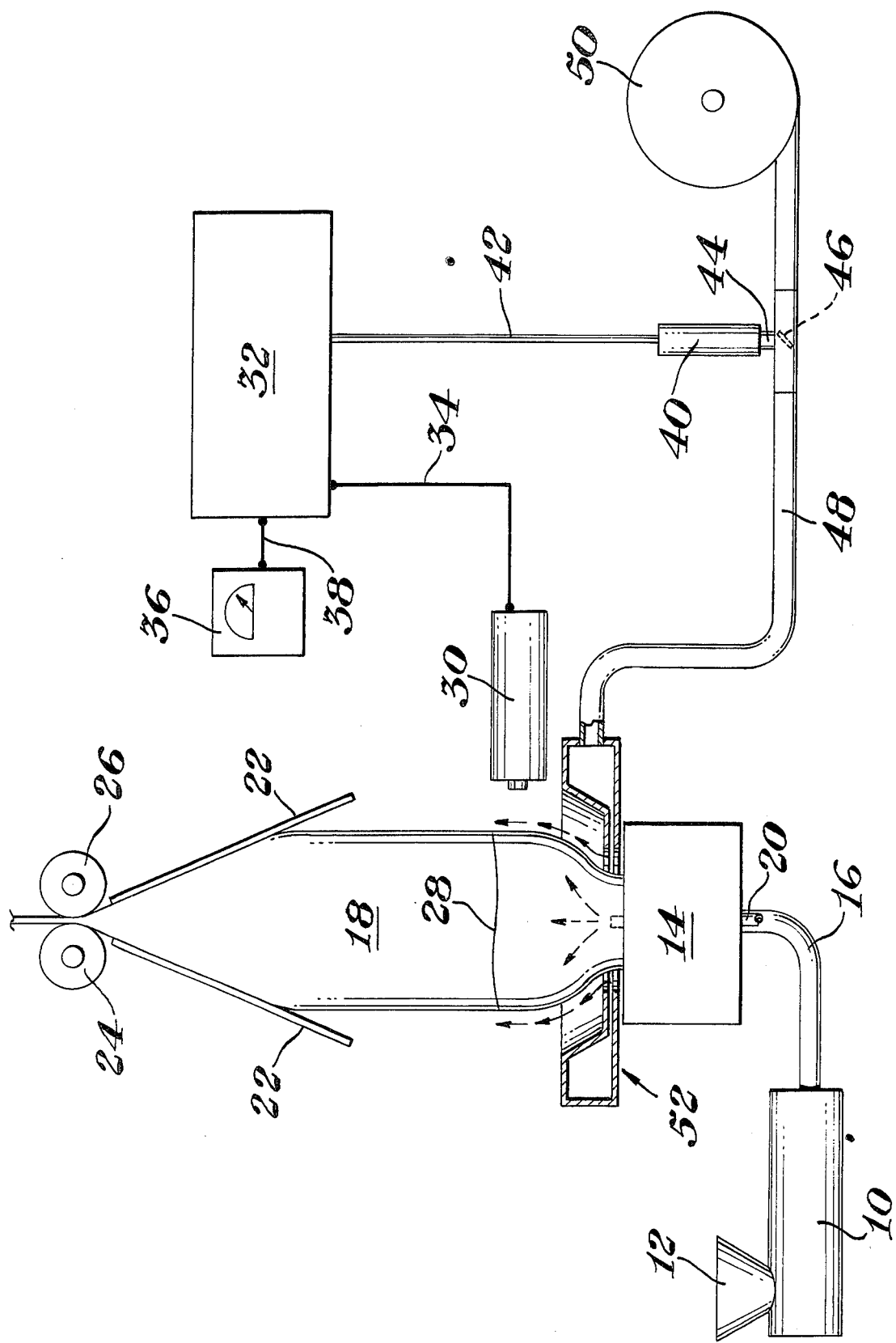

BLOWN FILM PROCESS

This application is a continuation of prior application Ser. No. 554,951, filed Mar. 3, 1975, now abandoned, and which is a continuation of application Ser. No. 376,834, filed July 5, 1973, now abandoned.

FIELD OF THE INVENTION

The blown film process as expressed or intended herein, is meant to refer broadly to the manufacture of plastic film (including sheet materials) through extruding a continuous molten tube of heat plastified resin, stretching or drawing the tube about a trapped air or gas bubble, and simultaneously cooling the plastic such as by external or internal cooling means. The invention particularly relates to such a process wherein a control area is defined, a control temperature determined for such area, and maintained through variable cooling steps, whereby improved film quality, and/or increased maximum production rates or ceilings are achieved. Alternately the invention concerns defining a controlled frost line position, monitoring such position, and providing a variable cooling means to correct deviations therefrom, for essentially like purposes and improved results.

BACKGROUND OF THE INVENTION

The ultimate properties and quality of blown film can be adversely affected particularly by cyclic variations in operating conditions, and by less than perfect regularity and consistency as regards the extruded resin. For example the temperature of the extrusion apparatus tends to have inherent cyclic character. Also cyclic conditions occur in conventional film cooling systems, whether based on a refrigerated source or if taken from ambient air. Additionally, film extruders frequently require a filtering system that will gradually clog with impurities, thus inducing a variable effect, particularly a change in melt index, in the resin passed through the filter. The resin itself may not be entirely consistant in quality, such as its melt index value and melt temperature.

Operating inconsistencies such of the above type can produce poor film in the sense of poor film flatness (i.e. appearance of wrinkles in the film) and poor uniformity of the gauge profile of the film. The gauge profile can be somewhat controlled by thickness measuring devices and systems, which give the operator some indication and warning when profile control is deteriorating, so that the appropriate control corrections can be made. However, when conditions go awry causing wrinkles to appear, there have not been good devices to predict this approaching condition, and to give the operator adequate warning to make appropriate corrections.

Thus even with close attention by a skilled operator, it has been difficult to control film quality above certain ceiling production rates. Even when operating within a production range considered manageable by a skilled operator, the film quality can be less than desired and less than specification tolerances, due to imprecise and inadequate control over cyclic and/or fluctuating operating conditions.

Accordingly, it would be advantageous to the art if there were available a blown film process which achieved finer and more precise control over film quality and/or properties.

It would be particularly advantageous if such a process provided a sufficient automatic counter-balancing effect to fluctuating and/or cyclic operating conditions to permit a significant increase in the possible rate of extrusion, while retaining an acceptable level of quality in the film produced, and/or which would consistently produce better quality film.

SUMMARY OF THE INVENTION

Briefly these and other objectives of the invention are achieved in blown film process using as a base control, the monitoring of a select control area of the film, or alternately, the monitoring of the position of the film frost line. A control temperature or control frost line position is determined which reflects the condition whereby good and preferably optimum quality film is produced, as per any given set of companion operating conditions. A variable cooling source is regulated responsive to signals received from the monitoring device, to stabilize and maintain the control temperature or control position, as applies, as an essentially constant operating condition. This system control provides precise, automatic control over film properties. It is particularly advantageous in providing prompt corrective response to the approaching condition of loss of film flatness, for which there has been inadequate warning or predicting systems in the past.

DETAILED DESCRIPTION OF THE INVENTION

The accompanying drawing illustrates a blown film process wherein there is represented and practiced a preferred embodiment of the inventive teaching and principles hereof.

Referring particularly to the drawing, a film forming resin is introduced into a heated extruder 10 through a hopper entry means 12, from whence it is eventually expelled in a heat plastified condition to a die head 14 by way of a connecting pipe or conduit 16. The resin emerges from the die in the form of a continuous tube or tubular envelope 18. The tube is stretched or drawn about a trapped bubble that is maintained and replenished by a regulated pressure line 20 that introduces generally controlled amounts of air or gas internally to the tube. A collapsing rack 22, and cooperating nip rolls 24 and 26, eventually collapse and flatten the tube at an area remote from the die head. This process will also typically include drive rolls comprising or located beyond nip rolls 24 and 26, to provide a pulling force to advance the tubing from the die. The speed of the drive rolls is controlled to stretch or draw the tubing longitudinally, and this speed factor, together with other controlling factors, will determine the circumferential size of this tube (i.e., whether it is distended, drawn-down, or maintained essentially the same as extruded size). The area of stretching occurs essentially between the die head and the film frost line shown at 28. Above the frost line, the film has advanced to a solidified or semi-solidified condition.

The invention particularly concerns a temperature sensing device 30 that is focused to read and continually monitor the temperature of the film in a control or target area that is underneath frost line 28, and above die head 14. The area of the film directly adjacent the frost line is not a good predictive or control area. This is presumably because of film crystallization effects near the frost line which tend to cause a stable temperature reading, or a reading which is not adequately predictive of changing conditions for which the control process hereof is designed to correct automatically. A good predictive control area, however, will exist at an area remote from and spaced sufficiently downwardly from the frost line so as to be less influenced (or non-influenced) by crystallization effects occurring at and in the near vicinity of the frost line.

The signal produced by the temperature sensing device, or the output of this device, is fed to a controller or controlling means 32 through an electrical lead or connection 34, and also to a temperature reading or recording instrument 36, through an electrical lead or connection 38. The temperature reading instrument converts the signal to a dial reading, thus permitting the temperature in the control area to be determined numerically at any given time in the operation.

The output of the controller, is suited to operate an air motor or valve positioner device 40, through a pneumatic line connection 42 therewith. The valve positioner is connected by a suitable linkage assembly 44 to operate and position a butterfly type valve 46. The butterfly valve is inset in a cooling air or gas line 48 which delivers air from a blower or compressor unit 50, to a cooling ring 52 that is disposed about the lower extreme or tube 18, just above die head 14.

The system depends on the selection or determination of a control or target temperature for the control area. This is most expediently determined empirically, by arriving at a given set of operating conditions that produce optimum quality film. Upon determining a set of such conditions, the temperature in the control area is read and established as the control temperature. The dial reading while not essential in running the controls, permits the operator to observe and record, if desired, the temperature in the control area. The controller is set to continually compare the signal received from the sensing device, with the control temperature, or equivalently a pre-determined control signal. If the signal would indicate the temperature in the monitored area is rising, the controller notes the difference, and directs the valve positioner 40 to proportionately move the butterfly valve to permit increased air flow to cooling ring 52, to bring the temperature in the control area downwardly to the control temperature. Alternately a temperature drop is responded to by regulating the butterfly valve to decrease the flow or output of cooling ring 52. Necessarily the null position, that is, the position the valve assumes when reading a stable temperature condition, is at a point between the extreme open and extreme closed positions of the butterfly valve.

The invention may also be practiced utilizing the height or position of the frost line as the control indicator. The monitoring device would be modified to optically or otherwise read the frost line height and produce signals indicating deviances therefrom. The control frost line position can be determined as before, that is, by operating empirically to define a given set of conditions under which quality film is produced, and defining the control position as that at which the frost line resides under such conditions. The signal provided by the monitoring device would be fed to the controller, and compared with a control signal, and corrective action taken, as required, to regulate air line 48, to thereby maintain or stabilize the control position.

The control process taught herein is applicable broadly to the production of plastic film, from film forming synthetic resin materials, based on the blown film process(s). Representative examples of films typically produced by this process are: polyethylene and known copolymers of ethylene and various other copolymerizing agents such as propylene, acrylic acid, ethyl acrylate, etc.; polypropylene and known copolymers thereof, film forming polyesters, polystyrene and known copolymers thereof, vinyls such as polyvinyl chloride; saran; film forming polyamides and the like.

The monitoring devices applicable for use in the invention would be heat sensing devices such as a suitable optical pyrometer or radiation thermometer, and thermal-couples or thermistors such as of the feather sensor type, applicable for delicate web materials. When the control is based on a controlled frost line position, a haze meter can be employed to read the position of the frost line, and to produce or generate a signal upon which to base or regulate the film cooling source.

The controller is preferably of the type adapted to compare the input signal from the monitoring device with a control signal, and provide an output signal that is generally proportional with the deviance, if any, of the input signal from the control signal.

The positioning device can be electrically or pneumatically driven, depending on the input signal, space available for same, valve type, and so forth. The butterfly valve shown may be replaced by numerous other regulating valve types, or other devices adapted to regulate the flow (or conceivably temperature) of the cooling gas or air supplied to the cooling ring. The blower can supply refrigerated or ambient gas or air as would be found most optimum or necessary for any given blown film process and resins. The cooling ring is necessarily in an area where it can influence the temperature of the film in the monitored area, or the height of the frost line, as applies. Most preferably the air ring is positioned generally in the area shown by the drawing. Understandably, other cooling devices can be substituted for the cooling ring shown, or employed together therewith (i.e., of the various types known to the art, such as internally positioned cooling devices).

Certain of the known blown film processes include operating modes that may necessitate some modification hereof in order to apply these teachings to such a process. For example, a revolving die head, or a revolving take-up assembly, or the like (i.e., such as to continually revolve tube 18), is oftentimes employed in the blown film process for certain resins and to produce certain end products. The process described above can and has been applied to a revolving blown film process, in a like control procedure as that described above, essentially without modification. However, under certain conditions, it may be desirable to read or monitor several control areas about a revolving tube, and/or to employ an integrator to average the temperature in the monitored area(s), and/or to regulate a cooling change only at specific intervals, such as after each complete revolution of the film, as may be found desirable or advantageous in any specific film line.

In addition to controlling the film properties or qualities explicitly mentioned above, the control temperature and/or control frost line position can also be determined to beneficially affect the more consistent attainment of film qualities such as relates to the properties of tear and impact strength, and film shrinkage characteristics. The control temperature or control frost line height, as applies, would thus be determined in regard to such properties, empirically or otherwise, to attain more consistent achievement thereof.

EXAMPLE I

The invention as described is applied to a polyethylene "revolving tube type" blown film process having a 20 inch diameter die head. An "IRCON MODLINE", non-contacting optical pyrometer or radiation thermometer, "Instrument Series 3400," is used as the instrument to sense and monitor the temperature of the film. A control area is defined that is at least about 3 inches below the frost line, and most optimally is about 9 inches below the frost line and at least about 6 inches above the die head. A control temperature of about 240° F is established. An "IRCON" proportional controller is employed, Instrument Series 3400, that receives continually the electrical output of the optical pyrometer and converts the same proportionally into a pneumatic output that controls an air piston motor having an integral butterfly valve. The latter unit or assembly is available under the trade designation "Valteck Vector One Butterfly Valve." An approximately 1500 CFM capacity blower unit is employed, and is operated at full capacity, subject to regulation only by the controlled position of the butterfly valve. The following Table I summarizes the results comparatively between control and no control situations, wherein: "Maximum Rate" refers to the maximum achievable rate possible, but not practical for commercial runs; and "Maximum Good Production" is the maximum rate at which "good" film is produced based on the qualities of acceptable film flatness and uniformity of gauge profile. The latter figures are given in lbs/hour and also 1000 lbs/month. The monthly figure reflects "down time" and other interruptions in the process.

TABLE I

| Description | No Control | Control |
|---|---|---|
| Max. Rate-Lbs./Hr. | 675 | 675 |
| Max. Good Prod.-Lbs./Hr. | 550 | 650 |
| Max. Good Prod.-M Lbs./Mo. | 380 | 419 |

EXAMPLE II

The control process hereof is also tested in a still higher volume, polyethylene blown process or production line, employing 30 inch diameter die, the process being also of the revolving tube type. The control process and the apparatus for accomplishing the same, is essentially the same as described supra. The control temperature and control area is near the same as with Example I. Significantly increased production capacity, as compared with the "no control situation", is also demonstrated in this test, with the results being tabulated below.

TABLE II

| Description | No Control | Control |
|---|---|---|
| Max. Rate-Lbs./Hr. | 1000 | 1000 |
| Max. Good Prod.-Lbs./Hr. | 800 | 950 |
| Max. Good Prod.-M Lbs./Mo. | 439 | 520 |

What is claimed is:

1. In a blown film process wherein film is produced through extruding a continuous molten tube of a film forming heat plastified synthetic resinous material, stretching or drawing the tube about a trapped air or gas bubble, and simultaneously cooling the tube, the steps comprising: monitoring the temperature of the film in a controlled area that is positioned between the frost line and extrusion die head, the control area being remote from and spaced sufficiently downwardly from the frost line so as to be less influenced by crystallization effects, cooling the film about its circumference between the control area and extrusion die head, setting a control temperature for the control area, comparing the monitored temperature with the control temperature, increasing or decreasing the rate of said cooling step responsive to the conditions of upward or downward drift, respectively, of the monitored temperature from the control temperature, whereby the process is characterized by an essentially constant temperature in the control area irrespective of cyclic variations in the operating parameters of the process.

2. The process of claim 1 wherein said cooling step comprises the step of varying the rate of gas flow in an air ring positioned between the control area and extrusion die head.

* * * * *